(12) United States Patent
Yamaguchi et al.

(10) Patent No.: US 8,541,128 B2
(45) Date of Patent: Sep. 24, 2013

(54) RECHARGEABLE LITHIUM BATTERY AND METHOD OF FABRICATING SAME

(75) Inventors: Takitaro Yamaguchi, Yokohama (JP); Ryuichi Shimizu, Yokohama (JP); Cheol-Soo Jung, Ohsan (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 12/253,203

(22) Filed: Oct. 16, 2008

(65) Prior Publication Data

US 2009/0061324 A1 Mar. 5, 2009

Related U.S. Application Data

(62) Division of application No. 11/582,624, filed on Oct. 17, 2006, now Pat. No. 7,452,635, which is a division of application No. 10/293,114, filed on Nov. 13, 2002, now Pat. No. 7,141,335.

(30) Foreign Application Priority Data

Dec. 3, 2001 (JP) .................................. 2001-369366

(51) Int. Cl.
*H01M 6/04* (2006.01)
(52) U.S. Cl.
USPC .............. 429/126; 429/304; 429/317; 427/58
(58) Field of Classification Search
USPC ................ 429/126, 246, 231.9, 231.95, 209, 429/304, 317; 427/58
See application file for complete search history.

(56) References Cited

U.S. PATENT DOCUMENTS

| | | | |
|---|---|---|---|
| 4,925,751 A | 5/1990 | Shackle et al. | |
| 5,648,011 A | 7/1997 | Blonsky | |
| 5,773,166 A * | 6/1998 | Matsui et al. ................. | 429/212 |
| 6,420,072 B1 | 7/2002 | Maruyama et al. | |
| 6,706,449 B2 * | 3/2004 | Mikhaylik et al. ............ | 429/246 |
| 2003/0104282 A1 | 6/2003 | Xing | |

FOREIGN PATENT DOCUMENTS

| | | |
|---|---|---|
| CN | 1118112 | 3/1996 |
| CN | 1317512 | 10/2001 |
| EP | 1054465 | 11/2000 |
| JP | 06-163078 | 6/1994 |
| JP | 08-96852 | 4/1996 |
| JP | 09-147912 | 6/1997 |
| JP | 9-251862 | 9/1997 |
| JP | 10-050303 | 2/1998 |
| JP | 11-214040 | * 8/1999 |
| JP | 11-288738 | 10/1999 |
| JP | 2000-67851 | 3/2000 |
| JP | 2000-215916 | 8/2000 |
| JP | 2000-251936 | 9/2000 |
| JP | 2000-306604 | 11/2000 |
| JP | 2000-319531 A | 11/2000 |
| JP | 2001-15166 | 1/2001 |

OTHER PUBLICATIONS

Structure Abstract for 6,706,449.*
Patent Abstract of Japan for Publication No. 10-050303, Publication date: Feb. 20, 1998.
Patent Abstract of Japan for Publication No. 2000-306604; Publication date: Nov. 2, 2000.
Patent Abstract of Japan for Publication No. 09-147912; Publication date: Jun. 6, 1997.
Patent Abstract of Japan, Publication No. 08-096852, Published Apr. 12, 1996 in the name of Sony Corp.
Patent Abstracts of Japan, Publication No. 09-251862, dated Sep. 22, 1997, in the name of Masaharu Azumaguchi et al.
Patent Abstracts of Japan, Publication No. 11-288738, dated Oct. 19, 1999, in the name of Ikuo Kato et al.
Patent Abstracts of Japan, Publication No. 2001-015166, dated Jan. 19, 2001, in the name of Soji Tsuchiya et al.
Japan Patent Office abstract, Publication No. 2000-319531 A, published Nov. 21, 2000, in the name of Toru Yamamoto et al.
Patent Abstract of Chinese Patent No. CN118112, Published Mar. 6, 1996.
Patent Abstract of Chinese Patent No. CN1317512, Published Oct. 17, 2001.

* cited by examiner

*Primary Examiner* — Laura Weiner
(74) *Attorney, Agent, or Firm* — Christie, Parker & Hale, LLP (57) ABSTRACT

Disclosed is a rechargeable lithium battery comprising a negative electrode and a positive electrode capable of intercalating and deintercalating lithium, and an electrolyte, wherein the electrolyte comprises a polyacrylate compound having three or more acrylic groups.

1 Claim, 3 Drawing Sheets

RECHARGEABLE LITHIUM BATTERY AND METHOD OF FABRICATING SAME

CROSS-REFERENCE TO RELATED APPLICATION(S)

This application is a divisional of U.S. patent application Ser. No. 11/582,624, filed Oct. 17, 2006, which issued as U.S. Pat. No. 7,452,635 on Nov. 18, 2008, which is a divisional of U.S. patent application Ser. No. 10/293,114, filed on Nov. 13, 2002, which issued as U.S. Pat. No. 7,141,335 on Nov. 28, 2006 which is based on and claims priority of Japanese patent application No. 2001-369366 filed in the Japanese Patent Office on Dec. 3, 2001 the disclosure of which is incorporated herein by reference.

BACKGROUND OF THE INVENTION (a) Field of the Invention

The present invention relates to a rechargeable lithium battery and a method of fabricating the same.

(b) Description of the Related Art

The demand for rechargeable lithium batteries having a high energy density is increasing as the use of portable electronic instruments such as portable phones, camcorders, and notebook computers is increasing. Particularly, when a negative electrode has low potential on charging a battery, it tends to decompose the electrolyte, so that battery performance factors such as capacity, capacity retention, cycle-life characteristics, and low temperature performance deteriorate. Accordingly, it is important to prevent the negative electrode from reacting with the electrolyte in order to improve battery performance in a rechargeable lithium battery having an electrolytic organic solution or a polymer electrolyte.

Reactivity with the negative electrode should be considered when choosing a material for an electrolyte. Many solvents and mixtures for the electrolyte have been proposed to be non-reactive with the negative electrode. In addition to non-reactivity, solubility of supporting salt, reactivity with the positive electrode, ion-conductivity, and cost are considered when choosing the solvent for an electrolyte.

Examples of non-aqueous solvents for a rechargeable lithium battery that have been proposed include ethylene carbonate, butylene carbonate, dimethyl carbonate, methyl ethyl carbonate, diethyl carbonate, γ-butyrolactone, methyl propionic acid, butyl propionic acid, ethyl propionic acid, and mixtures thereof.

Another approach that has been attempted is inhibiting the reaction between the negative electrode and the electrolyte by adding a certain compound to the electrolyte, so that the battery performance improves. However, the compound adversely affects the charge and discharge reaction, and it is hard to provide the desired voltage and current in the battery.

Japanese Patent Laid-open Publication No. 1996-96852 discloses a battery including a negative electrode having a material for doping and dedoping lithium or metallic lithium, in which a non-aqueous solvent is composed of vinylene carbonate. It is not expected to improve the battery performance in a battery having a negative electrode of carbonaceous material, however, since the vinylene carbonate insufficiently coats the negative electrode.

When vinylene carbonate is added, excessive gas is generated and the battery deforms. It is believed that the gas generation is caused by the decomposition of electrolyte during formation of the coating layer at the first charge. The electrolyte is thereby denatured by the gas generation, resulting in impairment of the battery performance.

SUMMARY OF THE INVENTION

In one embodiment, the present invention provides a rechargeable lithium battery including a positive electrode, a negative electrode, and an electrolyte. The electrolyte includes a polyacrylate compound having three (3) or more acrylic groups.

The present invention further provides a rechargeable lithium battery including a positive electrode, a negative electrode, and an electrolyte, wherein the positive and the negative electrodes are capable of intercalating and deintercalating lithium. The electrolyte is formed by impregnating an electrolytic organic solution with a polymer of a polyacrylate compound, and the surface of the negative electrode is coated with an organic layer of a polyacrylate compound. The polyacrylate compound is a compound having three (3) or more acrylic groups.

The present invention further provides a rechargeable lithium battery including a positive electrode, a negative electrode, and an electrolyte including an electrolytic organic solution as a main component. The surface of the negative electrode is coated with an organic layer of a polyacrylate compound having three (3) or more acrylic groups.

The present invention further provides a method of fabricating a rechargeable lithium battery including a positive electrode and a negative electrode capable of intercalating and deintercalating lithium, and an electrolyte, wherein the method includes adding a polyacrylate compound having three (3) or more acrylic groups to the electrolyte, and placing the electrolyte between the positive electrode and the negative electrode. The method may further include subsequently heating the electrolyte placed between the electrodes at a temperature ranging from 40 to 120° C.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE INVENTION

In the following detailed description, only a preferred embodiment of the invention has been shown and described, simply by way of illustration of the best mode contemplated by the inventors of carrying out the invention. As will be realized, the invention is capable of modification in various obvious respects, all without departing from the invention. Accordingly, the drawings and description are to be regarded as illustrative in nature, and not restrictive.

Figure 3:
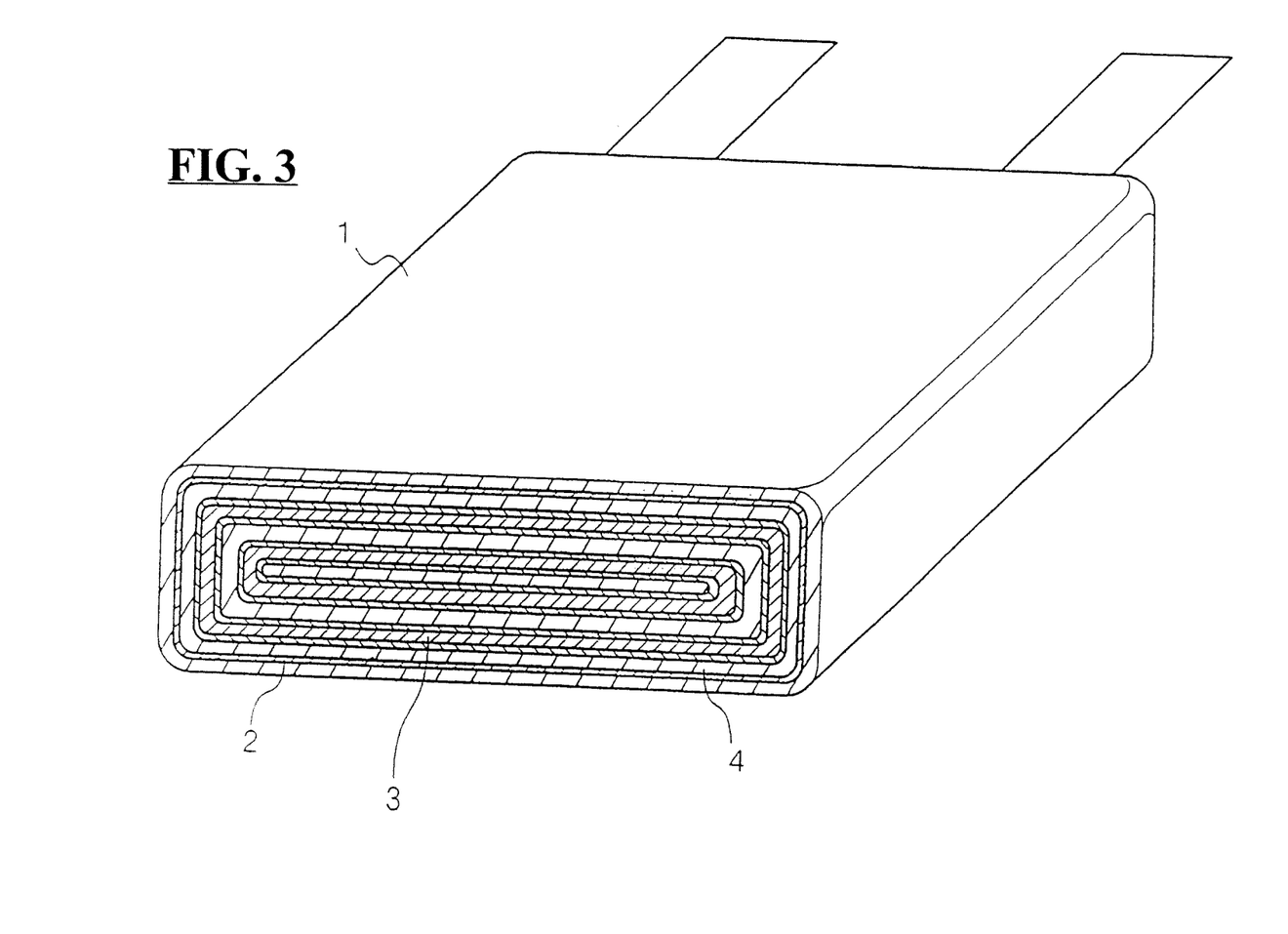
FIG. 3 is a perspective view of a battery according to the invention.

A rechargeable lithium battery of the present invention includes a positive electrode 3 and a negative electrode 4 capable of intercalating and deintercalating lithium, and an electrolyte. The positive electrode 3, negative electrode 4, and electrolyte, along with a separator 2, are put into a case 1 to fabricate a rechargeable lithium cell, as shown in FIG. 3. The electrolyte has a polyacrylate compound having three (3) or more acrylic groups.

At the initial charge of the rechargeable lithium battery, the polyacrylate compound is polymerized to form an organic layer on the surface of the negative electrode. Due to the organic layer, decomposition of electrolyte is prevented on the surface of the negative electrode even if the charge voltage is increased following repeated charges. Accordingly, gas generation and denaturation of the electrolyte are advantageously prevented, the charge and discharge capacity does not deteriorate, the cycle characteristics improve, and deformation of the battery is prevented.

The content of the polyacrylate compound preferably ranges from 0.001 to 10 wt %, and more preferably from 0.1 5 wt %, based on the weight of the electrolyte.

The electrolyte may further include at least one of acrylonitrile and methacrylonitrile. The content of the acrylonitrile and/or methacrylonitrile preferably ranges from 0.001 to 10 wt %, and more preferably from 0.05 to 1 wt %.

The electrolyte is formed by impregnating an electrolytic organic solution in a polymer of the polyacrylate compound.

The surface of the negative electrode is preferably coated with an organic layer of the polyacrylate compound and/or at least one of acrylonitrile and methacrylonitrile.

Preferably, the polyacrylate compound is represented by a formula selected from the following Formulae (1) to (3):

(1)

(2)

(3)

wherein

$0 \leq a \leq 15$, $0 \leq b \leq 15$, $0 \leq c \leq 15$, $3 \leq a+b+c \leq 15$.

The polyacrylate compound of formula 1 is trimethylol propane triacrylate, which has three acrylic groups in the molecule. The polyacrylate compound of formula 2 is trimethylol propane triethoxy triacrylate, which has three acrylic groups in the molecule. The polyacrylate compound of formula 3 is trimethylol propane tripropoxy triacrylate, which has three acrylic groups in the molecule.

Preferably, the polyacrylate compound has a dipentaerythritol structure represented by the following Formula 4, and more preferably comprises six (6) acrylate groups represented by the following Formula 5:

(4)

(5)

$Ac1:$ —CO—CH=$CH_2$
$Ac2:$ —CO—$(CH)_5$—O—CO—CH=$CH_2$

In the rechargeable lithium battery according to the present invention, $CO_2$ is preferably dissolved in the electrolyte.

According to the present invention, a method of fabricating a rechargeable lithium battery including a positive electrode and a negative electrode capable of intercalating and deintercalating lithium, and an electrolyte, includes adding a polyacrylate compound having three (3) or more acrylic groups to the electrolyte, and placing the electrolyte between the positive electrode and the negative electrode. It may further include subsequently heating the electrolyte placed between the electrodes at a temperature ranging from 40 to 120° C. Following the heating step, a polymer electrolyte is provided.

In the adding step, preferably at least one of acrylontrile and methacrylonitrile is further added to the electrolyte at the same time that the polyacrylate compound is added.

It is preferable to dissolve $CO_2$ in the electrolyte during the process. If the $CO_2$ is dissolved in the electrolyte before its placement between the electrodes, some lithium ions near the negative electrode react with the $CO_2$ to form a lithium carbonate layer, which compensates the decrease of ion conductivity at a low temperature. Accordingly, the low temperature performance of the rechargeable lithium battery is improved.

The polyacrylate compound according to the present invention is polymerized to form a polymer electrolyte comprising an electrolytic organic solution, as well as to form an organic layer on the surface of the negative electrode. Unless the polymer electrolyte is formed, the electrolyte includes an electrolytic organic solution as a main component.

The polymer electrolyte is produced better when the content of the polyacrylate compound is relatively high, whereas the electrolyte includes the electrolytic organic solution as a main component when the content is relatively low.

According to the present invention, the polyacrylate compound preferably has a structure selected from Formulae 1 to 3, that is, it is a tri-functional acrylic ester derivative with three (3) or more double bonds between carbons. The polyacrylate compound is an anion-polymerizable monomer which is capable of radical polymerization to generate the polymer electrolyte by heating. In addition, when the negative electrode has a low potential during battery charge, the polyacrylate compound forms an organic layer on the surface of the negative electrode. When the polyacrylate compound is heated, the anion polymerization is initiated, wherein 3 or more double bonds of carbons are opened in a molecule and each is bound to other polyacrylate molecules in a chain reaction. As a result, the organic layer is formed on the surface of the negative electrode by polymerization of the polyacrylate compound.

Preferably, the polyacrylate compound has a dipentaerythritol structure as represented by Formula 4, and more preferably, it has six (6) acrylic groups as represented by Formula 5.

The organic layer according to the present invention may also include acrylonitrile and/or methacrylonitrile in addition to the polyacrylate compound. Similar to when the polyacrylate compound is provided alone, the anion polymerization occurs on the surface of the negative electrode having a low voltage during the charge, so that the organic layer is coated on the negative electrode.

Although the detailed structure has not been demonstrated, it is hypothesized to be a copolymer of the polyacrylate compound and acrylonitrile and/or methacrylonitrile. The organic layer has a high lithium ion conductivity, and it is a durable layer that resists electrolysis.

The organic layer is very thin, having a thickness on the order of several to scores of nm. If the thickness is on the order of several Ξm, it is hard for the lithium ions to permeate the layer so that the charge and discharge reaction is difficult to carry out. When the thickness is less than 1 nm, it is not preferred since the shape of the layer is not maintained.

Since the organic layer is formed on the surface of the negative electrode, it prevents the negative electrode from directly contacting the electrolyte. Accordingly, the reductive decomposition of electrolyte is inhibited on the surface of the negative electrode, so the gas generated by decomposition of the electrolyte decreases and the electrolyte is not denatured. As a result of decreasing the gas generation, the inner pressure of the battery is not increased, so the battery is not deformed. By preventing the denaturation of electrolyte, the amount of electrolyte does not decrease. Since the charge and discharge reaction occurs smoothly, the charge and discharge efficiency increases and the cycle characteristics improve.

As the reaction between the electrolyte and the negative electrode is suppressed, the electrolyte does not denature, and the battery performance factors, such as charge and discharge efficiency and cycle characteristics do not deteriorate even when the battery is stored for a long time at a high temperature.

Since the organic layer has high ion conductivity, it acts to deliver lithium ions between the electrolyte and the negative electrode.

Although the surface of the negative electrode is coated with the organic layer, it does not disturb the movement of lithium ions so the charge and discharge reaction occurs smoothly, and the charge and discharge efficiency is thereby increased and the cycle characteristics are improved. In addition, the internal impedance of the battery is not increased and the charge and discharge capacity is not remarkably reduced.

The example of the electrolyte mentioned is an electrolytic organic solution in which lithium salt is dissolved in a non-aqueous solvent.

Examples of the non-aqueous solvent include, but are not limited to, propylene carbonate, ethylene carbonate, butylene carbonate, benzonitrile, acetonitrile, tetrahydrofuran, 2-methyltetrahydrofuran, γ-butyrolactone, dioxolane, 4-methyldioxolane, N,N-dimethylformamide, dimethylacetamide, dimethylsulfoxide, dioxane, 1,2-dimethoxyethane, sulfolane, dichloroethane, chlorobenzene, nitrobenzene, dimethylcarbonate, methylethylcarbonate, diethylcarbonate, methylpropylcarbonate, methylisopropylcarbonate, ethylbutylcarbonate, dipropylcarbonate, diisopropylcarbonate, dibutylcarbonate, diethyleneglycol, dimethylether, and mixtures thereof, and any conventional solvent known for a rechargeable lithium battery in the art. Preferably, it includes any one of propylene carbonate, ethylene carbonate, or butylene carbonate, and a further any one of dimethyl carbonate, methyl ethyl carbonate, and diethyl carbonate.

Useful lithium salts include those selected from the group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_4$, $LiAlCl_4$, $LiN(C_xF_{2x+1}SO_2)(C_yF_{2y+1}SO_2)$ (where x and y are natural numbers), LiCl, LiI, and mixtures thereof. It also includes any conventional lithium salts known for a rechargeable lithium battery in the art. It preferably includes either one of $LiPF_6$ or $LiBF_4$.

Other suitable electrolytes include polymers such as polyethylene oxide (PEO), polypropylene oxide (PPO), polyacrylonitrile (PAN), polyvinylidene fluoride (PVDF), polymethacrylate (PMA), polymethyl methacrylate (PMMA), and polymer electrolytes in which the polymer is impregnated in an electrolytic organic solution.

It is preferable that $CO_2$ is dissolved in the electrolytic organic solution (or electrolyte) in advance. $CO_2$ may thereby form a lithium carbonate layer by reacting with some lithium ions moved to the negative electrode site. The lithium carbonate layer compensates the deterioration of ion conductivity on organic layers so that the low temperature performance of the battery is improved.

The polyacrylate compound is preferably added to the electrolyte in an amount ranging from 0.001 to 10 wt %, and more preferably ranging from 0.1 to 5 wt %, prior to forming the organic layer.

If the content of the polyacrylate compound is less than 0.001 wt %, it is not preferable since the organic layer is insufficiently formed. If the content is more than 10 wt %, the organic layer is overly thick so that the impedance is inevitably increased.

The acrylonitrile and/or methacrylonitrile is preferably added to the electrolyte in an amount ranging from 0.001 to 10 wt %, and more preferably ranging from 0.05 to 1 wt % prior to forming the organic layer.

If the content of acrylonitrile and/or methacrylonitrile is less than 0.001 wt %, it is not preferable since the organic layer is insufficiently formed. If the content is more than 10 wt %, the organic layer is overly thick so that the impedance is inevitably increased.

The negative electrode includes, for example, those formed by mixing a negative active material powder and a binder such as polyvinylidene fluoride, and optionally a conductive agent such as carbon black, and shaping it to a plane circle. An example of the negative active material is a carbonaceous material such as artificial graphite, natural graphite, carbon fiber graphite, graphite meso carbon microbeads, or amorphous carbon. Useful negative active materials include metals capable of alloying with lithium, and any complex comprising the metal and carbonaceous material. Metals capable of alloying with lithium include Al, Si, Sn, Pb, Zn, Bi, In, Mg, Ga, and Cd. Further, a metal lithium foil may also be used as a negative electrode.

The morphology of the organic layer on the surface of the negative electrode should be considered, as well as the coating state of the organic layer formed on the surface of particle material consisting of the negative active material or the coating state of the organic layer formed on the metal lithium foil.

The positive electrode includes, for example, those formed by mixing a positive active material powder and a binder such as polyvinylidene fluoride, and optionally a conductive agent such as carbon black, and shaping it to a sheet or a circle form. Examples of positive active material include a complex oxide of lithium and at least one selected from the group consisting of cobalt, manganese, and nickel. It is preferably $LiMn_2O_4$, $LiCoO_2$, $LiNiO_2$, $LiFeO_2$, or $V_2O_5$. It may further comprise a compound, such as TiS, MoS, an organic disulfide compound, or an organic polysulfide compound, capable of reversible intercalation and deintercalation of lithium ions.

Hereinafter, an exemplary method of fabricating a rechargeable lithium battery according to the present invention is described.

A rechargeable lithium battery is fabricated according to an assembly process including adding a polyacrylate compound to an electrolyte, and placing the resultant electrolyte between the positive electrode and the negative electrode.

The electrolyte may be a polymer electrolyte or an electrolytic organic solution. The method may further include preparing the polymer electrolyte prior to the adding step. At least one of acrylontrile and methacrylonitrile may be added with the polyacrylate compound.

The content of the polyacrylate compound preferably ranges from 0.01 to 10 wt %, and more preferably from 0.1 to 5 wt %. The content of acrylonitrile or methacrylonitrile preferably ranges from 0.01 to 10 wt. %, and more preferably from 0.05 to 1 wt. %.

In this case, $CO_2$ is preferably dissolved in the electrolyte in advance. To dissolve $CO_2$ in the electrolyte, any means for blowing $CO_2$ gas may be employed. By dissolving $CO_2$ in the electrolyte in advance, some lithium ions moved to the negative electrode react with $CO_2$ to form a lithium carbonate layer. The lithium carbonate layer compensates for the deterioration of ion conductivity of the organic layer at a low temperature, so that the low temperature battery characteristics are improved.

Subsequently, the electrolyte is positioned between the positive electrode and the negative electrode. When the electrolyte is in liquid phase, the electrolyte is impregnated in a container enclosing the positive electrode, the negative electrode, and a separator interposed between the negative and the positive electrodes. Whereas when the electrolyte is in solid phase or semi-solid phase, the electrolyte is interposed between the positive electrode and the negative electrode.

Then, the electrolyte having at least the polyacrylate compound positioned between the negative electrode and the positive electrode is subjected to a heating step at a temperature ranging from 40 to 120° C. Upon heating of the electrolyte, the polyacrylate compound is radically polymerized to form a polymer, and the polymer is immersed in the electrolytic organic solution. Further, the surface of the negative electrode is adsorbed with some of the polyacrylate compound, and/or the acrylonitrile and/or the methacrylonitrile.

When the heating is carried out at a temperature of less than 40° C., it is not preferable since the radical polymerization occurs insufficiently, and if the temperature is in excess of 120° C., it is not preferable since the electrolyte is denatured resulting in a deterioration of the battery characteristics.

In the assembly process, when the polymer electrolyte is interposed between the positive electrode and the negative electrode, the heating step may be omitted. The heating step may be also omitted when employing an electrolyte essentially composed of the electrolytic organic solution.

When acrylonitrile and/or methacrylonitrile along with the polyacrylate compound are added to the electrolytic organic solution, the organic layer including the polyacrylate compound and acrylonitrile and/or methacrylonitrile is formed on the negative electrode. When acrylonitrile and/or methacrylonitrile are included, the organic layer has improved ion conductivity and charge and discharge efficiency since the internal impedance is decreased. Acrylonitrile and/or methacrylonitrile are polymerized together with the polyacrylate compound to form the organic layer. Alternatively, acrylonitrile and/or methacrylonitrile may be dissolved in the polymer of the polyacrylate compound to form the organic layer.

Further, upon forming the organic layer, the contents of the polyacrylate compound, acrylonitrile and/or methacrylonitrile are remarkably decreased in the electrolytic organic solution.

According to the method of fabricating a rechargeable lithium battery, the polyacrylate compound is radically polymerized by heating to provide a polymer, and at the same time, the polymer electrolyte is formed by impregnating the electrolytic organic solution into the polymer. The organic layer is thereby formed on the surface of the negative electrode before the resultant electrolyte is decomposed.

The following Examples further illustrate the present invention in detail but are not to be construed to limit the scope thereof.

Preparation of a Rechargeable Lithium Cell Using an Electrolyte Including a Polyacrylate Compound Alone

Example 1

0.2 wt % of trimethylolpropane triacrylate (molecular weight: 269) represented by Formula 1 and 99.8 wt % of electrolytic organic solution were mixed for 30 minutes to prepare an electrolyte precursor. For the electrolytic organic solution, a 1M/L $LiPF_6$ solution of ethylene carbonate and dimethyl carbonate (EC/DMC) (3:7 volume ratio) was used.

A pellet-type positive electrode having a $LiCoO_2$ positive active material was placed over a pellet-type negative electrode having a negative active material of carbon fiber, they were inserted into a container, and the electrolyte was then injected into the container. The container was packed to provide a coin-type cell having a diameter of 20 mm and a thickness of 1.6 mm.

The coin-type cell was heated at 40° C. for 8 hours to obtain a rechargeable lithium cell. Upon heating of the cell, unreacted polyacrylate compound is polymerized to form an organic layer on the negative electrode.

Example 2

A rechargeable lithium cell was prepared in the same manner as in Example 1, except that 0.2 wt % of trimethylolpropane triethoxy triacrylate (average molecular weight: 912) represented by Formula 2 (in Formula 2, a+b+c=14) was mixed with 99.8 wt % of electrolytic organic solution.

Example 3

A rechargeable lithium cell was prepared in the same manner as in Example 1, except that 0.2 wt % of trimethylolpropane tripropoxy triacrylate (average molecular weight: 460) represented by Formula 3 (in Formula 3, a+b+c=3) was mixed with 99.8 wt % of electrolytic organic solution.

Example 4

A rechargeable lithium cell was prepared in the same manner as in Example 1, except that 0.2 wt % of caprolactone-modified dipentaerythritol hexaacrylate was mixed with 99.8 wt % of electrolytic organic solution.

Preparation of Rechargeable Lithium Cell by Adopting the Electrolyte Including a Polyacrylate Compound Together with Acrylonitrile or Methacrylonitrile

Example 5

A rechargeable lithium cell was prepared in the same manner as in Example 1, except that 0.1 wt % of trimethylolpropane triethoxy triacrylate (average molecular weight: 405) represented by Formula 1 (in Formula 1, a+b+c=14) and 0.1 wt % of acrylonitrile were mixed with 99.8 wt % of electrolytic organic solution.

Example 6

A rechargeable lithium cell was prepared in the same manner as in Example 1, except that 0.1 wt % of trimethylolpropane triethoxy triacrylate (average molecular weight: 912) represented by Formula 2 (in Formula 2, a+b+c=14) and 0.1 wt % of methacrylonitrile were mixed with 99.8 wt % of electrolytic organic solution.

Example 7

A rechargeable lithium cell was prepared in the same manner as in Example 1, except that 0.1 wt % of trimethylolpropane tripropoxy triacrylate (average molecular weight: 460) represented by Formula 3 (in Formula 3, a+b+c=3) and 0.1 wt % of acrylonitrile were mixed with 99.8 wt % of electrolytic organic solution.

Example 8

A rechargeable lithium cell was prepared in the same manner as in Example 1, except that 0.25 wt % of trimethylolpropane tripropoxyacrylate (average molecular weight: 460) represented by Formula 3 (in Formula 3, a+b+c=3) and 0.25 wt % of acrylonitrile were mixed with 99.5 wt % of electrolytic organic solution.

Example 9

A rechargeable lithium cell was prepared in the same manner as in Example 1, except that 1 wt % of trimethylolpropane tripropoxy triacrylate (average molecular weight: 460) represented by Formula 3 (in Formula 3, a+b+c=3) and 0.25 wt % of acrylonitrile were mixed with 98.75 wt % of electrolytic organic solution.

Example 10

A rechargeable lithium cell was prepared in the same manner as in Example 1, except that 0.1 wt % of caprolactone-modified dipentaerythritol hexaacrylate and 0.1 wt % of acrylonitrile were mixed with 99.8 wt % of electrolytic organic solution.

Comparative Example 1

A rechargeable lithium cell was prepared in the same manner as in Example 1, except that the trimethylolpropane triacrylate (average molecular weight: 269) represented by Formula 1 was not used.

Capacity Retention of Examples 1 to 10 and Comparative Example 1

Rechargeable lithium cells of Examples 1 to 10 and Comparative Example 1 were charged and discharged 50 times, and the first discharge capacity and the 50th discharge capacity were measured.

The capacity retention in percent (%) was calculated as the proportion of the 50th discharge capacity to the first discharge capacity. The results are listed in Table 1.

TABLE 1

|  | Capacity Retention [%] |
| --- | --- |
| Example 1 | 100 |
| Example 2 | 88 |
| Example 3 | 86 |
| Example 4 | 100 |
| Example 5 | 80 |
| Example 6 | 75 |
| Example 7 | 100 |
| Example 8 | 89 |
| Example 9 | 72 |
| Example 10 | 88 |
| Comparative Example 1 | 55 |

As clearly shown in Table 1, the cells according to Examples 1 to 10, in which the polyacrylate compound was added, have capacity retentions of more than 70%, and are superior in capacity retention to the cell according to Comparative Example 1.

Example 11

0.2 wt. % of caprolactone-modified dipentaerythritol hexaacrylate and 99.8 wt % of electrolytic organic solution were mixed for 30 minutes to prepare an electrolyte precursor. For the electrolytic organic solution, a 1M/L LiPF$_6$ solution of ethylene carbonate and dimethyl carbonate (EC/DMC) (3:7 volume ratio) was used.

A sheet-type positive electrode having a positive active material of LiCoO$_2$ was stacked on a sheet-type negative electrode having a negative active material of carbon fiber, and they were wound to an oval jelly-roll shape and inserted into a rectangular container. The container was packed to provide a prismatic-shaped lithium cell having a thickness of 4 mm, a width of 3 mm, and a height of 60 mm.

Comparative Example 2

Two prismatic-shaped lithium cells were prepared in the same manner as in Example 11, except that the caprolactone-modified dipentaerythritol hexaacrylate was not used.

Initial Discharge Capacity Retention on Example 11 and Comparative Example 2

Four cells according to Example 11 (two cells: Nos. 1 and 2) and Comparative Example 2 (two cells: Nos. 1 and) were activated by charging and discharging twice at the charge and discharge rate of 0.2C. They were then charged at 0.5C and discharged at various rates of 0.2C, 0.5C, 1C, and 2C, and their discharge capacities were measured at each rate. The results are listed in Table 2.

TABLE 2

|  | Discharge Rate (C) | Discharge Capacity (mAh) |
| --- | --- | --- |
| Example 11 (1) | 2 | 584 |
|  | 1 | 645 |
|  | 0.5 | 655 |
|  | 0.2 | 662 |
| Example 11 (2) | 2 | 586 |
|  | 1 | 647 |
|  | 0.5 | 654 |
|  | 0.2 | 661 |

TABLE 2-continued

|  | Discharge Rate (C) | Discharge Capacity (mAh) |
|---|---|---|
| Comparative Example 2 (1) | 2 | 549 |
|  | 1 | 634 |
|  | 0.5 | 643 |
|  | 0.2 | 649 |
| Comparative Example 2 (2) | 2 | 555 |
|  | 1 | 632 |
|  | 0.5 | 642 |
|  | 0.2 | 649 |

As shown in Table 2, the cells according to Example 11 show better discharge capacity and initial discharge capacity over those of Comparative Example 2, suggesting that improvements of discharge capacity result from adding a polyacrylate compound.

It is estimated that since the cells of Example 11 are applied with an organic layer of polyacrylate compound preventing the negative electrode from reacting with the electrolyte, the electrolyte does not denature and the charge and discharge efficiency increases.

Cycle-Life Characteristics of Rechargeable Lithium Cells According to Example 11 and Comparative Example 2

Figure 1:
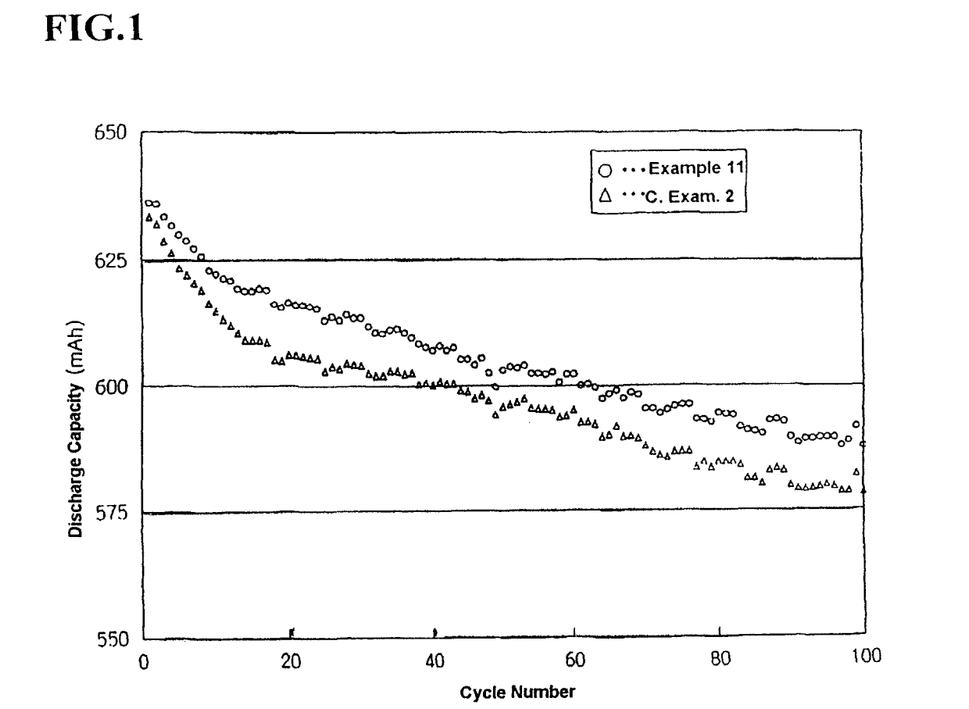
FIG. 1 is a graph illustrating the relationship between the cycle number and the discharge capacity of the cells of Example 11 of the present invention and Comparative Example 2.

FIG. 1 shows the relationship between the cycle number and the discharge capacity of rechargeable lithium cells according to Example 11 and Comparative Example 2, which were measured when they were charged and discharged at a charge rate of 0.5C and a discharge rate of 1C.

As shown in FIG. 1, the discharge capacity of the cell of Example 11 measured after 50 cycles was slightly higher than that of Comparative Example 2. When comparing the discharge capacity with the progression of the charge and discharge cycles, it is estimated that the discharge capacity is improved by adding the polyacrylate compound.

That results from forming an organic layer of polyacrylate on the surface of the negative electrode in Example 11, so that the decomposition of electrolyte is prevented, the denaturation of electrolyte is prevented, and the charge and discharge efficiency is increased.

Whereas in Comparative Example 2, the electrolyte denatures and the charge and discharge efficiency decreases as cycles progress due to the direct contact of the negative electrode with the electrolyte.

Example 12

0.2 wt % of trimethylolpropane triacrylate (molecular weight: 269) represented by Formula 1 and 99.8 wt % of electrolytic organic solution were mixed for 30 minutes. $CO_2$ gas was blown thereinto to prepare an electrolyte precursor. For the electrolytic organic solution, a 1 M/L $LiPF_6$ solution of ethylene carbonate, diethyl carbonate, and γ-butyrolactone (EC:DEC:GBL) (1:1:1 volume ratio) was used.

A sheet-type positive electrode having a positive active material of $LiCoO_2$ was stacked on a sheet-type negative electrode having a negative active material of carbon fiber and wound to an oval jelly-roll shape, followed by insertion into a rectangular container. The container was packed to provide a prismatic-shaped lithium cell having a thickness of 4 mm, a width of 30 mm, and a height of 60 mm.

The obtained prismatic lithium cell was heated at 60° C. for 3 hours.

Comparative Example 3

A prismatic lithium cell was prepared in the same manner as in Example 12, except that the trimethylolpropane triacrylate was not used.

Cycle-Life Characteristics of Rechargeable Lithium Cells According to Example 12 and Comparative Example 3

Figure 2:
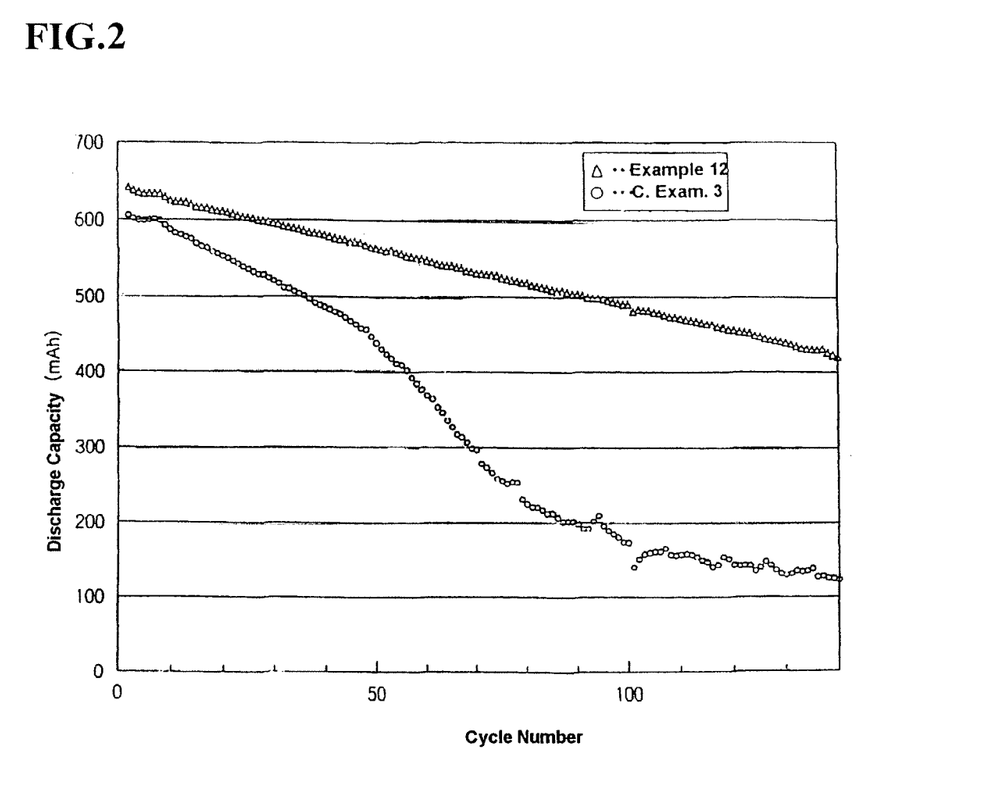
FIG. 2 is a graph illustrating the relationship between the cycle number and the discharge capacity of the cells of Example 12 of the present invention and Comparative Example 3.

FIG. 2 shows the relationship between the cycle number and the discharge capacity of prismatic lithium cells according to Example 12 and Comparative Example 3, which were measured when they were repeatedly charged and discharged at a charge rate of 0.5C and a discharge rate of 1C.

Furthermore, Table 3 shows discharge retentions of Example 12 and Comparative Example 3 at 50 cycles and 100 cycles with respect to the first discharge capacity (600 mAh), at room temperature. It further shows the discharge capacity, which was measured when the cells were charged and discharged at −20° C.

TABLE 3

|  | Discharge Capacity Retention (%) (at room temperature) | | Discharge Capacity |
|---|---|---|---|
|  | 50th cycle | 100th cycle | (mAh) (at −20° C.) |
| Example 12 | 93.7 | 81.7 | 521 |
| Comparative Example 3 | 71.6 | 28.7 | 515 |

As shown in FIG. 2 and Table 3, the discharge capacity with progression to 100 cycles of cell of Example 12 is remarkably higher than that of Comparative Example 3. When the solvent for the electrolytic organic solvent comprises GBL, the discharge capacity improves by adding the polyacrylate compound.

Whereas the electrolyte denatures and the charge and discharge efficiency decreases with repeated cycles due to direct contact of the negative electrode with the electrolyte in Comparative Example 3.

As shown in Table 3, the charge and discharge capacity of the cell of Example 12 at a low temperature is improved over that of Comparative Example 3 due to the addition of a polyacrylate compound and $CO_2$. It is believed that the improvements result from the addition of the polyacrylate compound and $CO_2$.

As detailed in the above description, a polyacrylate compound is initially polymerized to form an organic layer on the surface of the negative electrode at the initial charge so that decomposition of the electrolyte is prevented even if the charge voltage increases. The gas generation that occurs as a result of the decomposition of the electrolyte thereby decreases, and the denaturation of the electrolyte decreases. A rechargeable lithium battery is therefore provided in which the charge and discharge capacity does not decrease and the cycle-life characteristics are improved.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A rechargeable lithium battery comprising:
a positive electrode capable of intercalating and deintercalating lithium;
an electrolyte comprising an electrolytic organic solution comprising a polyacrylate compound selected from the group consisting of compounds represented by Formulae (1) and (3) and combinations thereof:

where $0 \leq a \leq 15$, $0 \leq b \leq 15$, $0 \leq c \leq 15$, $3 \leq a+b+c \leq 15$, and wherein the polyacrylate compound is present in the electrolyte in an amount of 0.01 to 10 wt %; and
wherein the polyacrylate compound is present in the electrolyte in an amount of 0.01 to 10 wt %; and
a negative electrode, wherein the surface of the negative electrode is coated with an organic layer of the polyacrylate compound during charge of the battery.

* * * * *

UNITED STATES PATENT AND TRADEMARK OFFICE
CERTIFICATE OF CORRECTION

PATENT NO. : 8,541,128 B2
APPLICATION NO. : 12/253203
DATED : September 24, 2013
INVENTOR(S) : Takitaro Yamaguchi et al.

It is certified that error appears in the above-identified patent and that said Letters Patent is hereby corrected as shown below:

In the Claims

Column 13, Claim 1, lines 22-24    Delete "where $0 \leq a \leq 15$, $0 \leq b \leq 15$, $0 \leq c \leq 15$, $3 \leq a+b+c \leq 15$, and wherein the polyacrylate compound is present in the electrolyte in an amount of 0.01 to 10 wt%; and"

Signed and Sealed this
Second Day of December, 2014

Michelle K. Lee
*Deputy Director of the United States Patent and Trademark Office*